Patented Nov. 8, 1938

2,136,044

UNITED STATES PATENT OFFICE 2,136,044

2,3,6-TRIAMINO-PYRIDINE AND PROCESS OF MAKING IT

Max Engelmann, Wilmington, Del., assignor to E. I. du Pont de Nemours & Company, Wilmington, Del., a corporation of Delaware No Drawing. Application February 9, 1935, Serial No. 5,862

10 Claims. (Cl. 260—42)

This invention relates to carbon compounds and more particularly to tri-amino-pyridines and their derivatives, such as salts, oxidation products, saponification products and the like.

The compound 3-nitroso-2:6-di-amino-pyridine, having the formula:

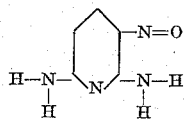

is disclosed by Tschitschibabin and Seide in Chem. Central Blatt 1923 Part III, p. 1022. At the same place these investigators also disclose 3-benzene-azo-2:6-di-amino-pyridine, having the formula:

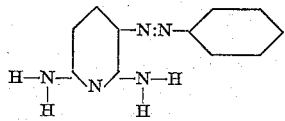

It has now been found that di-amino-pyridine products having a ring carbon atom joined to the nitrogen atom of a reducible radical (for example, the compound mentioned above), can be converted to tri-amino-pyridines.

This invention had for an object the preparation of new chemical compounds and new processes for the production of tri-amino-pyridines. Other objects were the preparation of tri-amino-pyridines in a very desirable physical form and in a high state of purity. Still further objects were to produce new pharmaceuticals and dye intermediates. A general advance in the art and other objects which will appear hereinafter are also contemplated.

The foregoing objects and related ends are accomplished in the manner set forth in the following description in which details of what is believed to be the best mode for carrying out the invention are disclosed.

Specifically one method for accomplishing the aforementioned objects and obtaining the newly discovered products is by treating a suspension of 3-nitroso-2:6-di-amino-pyridine with hydrogen sulfide until the 2:3:6-tri-amino-pyridine, having the formula:

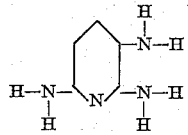

is produced. The invention will be further understood by a consideration of the following detailed description and illustrative specific examples in which the parts are given by weight:

Example

One hundred (100) parts of 3-nitroso-2:6-di-amino-pyridine were suspended in 500 parts of water and treated with hydrogen sulfide at about 40°–45° C. When all small crystals of the nitroso compounds had disappeared the reduction was complete. The sulfur formed during the reaction being insoluble in the resultant solution of the free base was filtered off. From the filtrate the desired product was isolated as its oxalic acid salt. (It is possible to isolate the free base by rendering the clarified filtrate alkaline.) This separation was accomplished by treating the filtrate with a warm solution of 150 parts of oxalic acid in 600 parts of water. The crystallization of the oxalic acid salt from the solution started immediately after the addition of the aforesaid oxalic acid solution began. In order to complete the separation, the resultant liquid was cooled. The salt was filtered off, washed first with water and thereafter with alcohol and finally with di-ethyl ether.

The 2:3:6-tri-amino-pyridine oxalate does not melt when heated to as high as 300° C. It is only slightly soluble in cold water. It is much more soluble in hot water from which it can be re-crystallized. It is insoluble in alcohol, di-ethyl-ether and benzene. It dissolves in dilute alkaline solutions (for example 5% sodium hydroxide) causing the formation of the free base. The free base, when exposed to air, oxidizes at once to a blue dye. The chemical structure of this blue dye has not been determined. Because of the ease of oxidation of the free base it is not desirable to prepare the same unless it is to be used immediately or is to be maintained out of contact with oxidizing agencies. The aforementioned blue dye can be obtained in suspension by oxidizing the free base in neutral or alkaline solutions with known oxidizing agents (for example, iron-tri-chloride, hydrogen peroxide and the like). It can also be oxidized in weak acid solutions by treatment with sodium (or other alkali metal) nitrite.

It has been found that this blue dyestuff is converted by boiling with water (probably a saponification process) into a greenish-yellow dye of unusual brilliant blue fluorescence and unknown structure.

The 2:3:6-tri-amino-pyridine can also be obtained by the reduction (for example with zinc dust and acetic acid in a water suspension) of azo dyes made by coupling diazotized aromatic amines (for instance diazotized aniline) with 2:6-di-amino-pyridine.

Other reducing agents (well known to those skilled in organic chemistry) than the hydrogen sulfide, for example zinc dust in acetic acid solution and the like, may be used in the reduction of the 3-nitroso-2:6-di-amino-pyridine or other compound, to the 2:3:6-tri-amino-pyridine. Hydrogen sulfide is preferable, however, since no other compound except insoluble sulfur is present during and after the reduction.

While the best results have been obtained in carrying out the hydrogen sulfide reduction at 40°–45° C. it will be understood that a wider range of temperatures for instance from room temperature or lower to temperatures approximating the boiling point of the suspension, is available if the person carrying out the reduction so desires.

In an equivalent manner the related compounds, such as the substituted derivatives of the tri-amino-pyridine, are obtainable. Among these specific mention may be made of the derivatives of tri-amino-pyridine having alkyl (methyl, ethyl, propyl, butyl and the like), hydroxyl and halogen (chlorine, bromine and the like) substituents.

Tri-amino-pyridines either as the free bases or in the form of their acid salts (for example the oxylate, the phthalate, the phosphate, the sulfate, the nitrate, the hydrochloride and the hydrobromide) are valuable pharmaceuticals and important as intermediates for dyes (for such fabrics as silk, wool, cotton and the like), pharmaceuticals and the like.

As many apparently widely different embodiments of this invention may be made without departing from the spirit and scope thereof, it is to be understood that I do not limit myself to the specific embodiments thereof except as defined by the appended claims.

I claim:

1. The process which comprises suspending about 100 parts of 3-nitroso-2:6-di-amino-pyridine in about 500 parts of water and treating the resultant with hydrogen sulfide at about 40°–45° C. until crystals of the nitroso compound have disappeared.

2. The process which comprises suspending about 100 parts of 3-nitroso-2:6-di-amino-pyridine in about 500 parts of water and treating the resultant with a reducing agent from the group consisting of hydrogen sulfide and zinc dust in acetic acid solution at about 40°–45° C. until crystals of the nitroso compound have disappeared.

3. The process which comprises suspending about 100 parts of 3-nitroso-2:6-di-amino-pyridine in about 500 parts of water and treating the resultant with hydrogen sulfide until crystals of the nitroso compound have disappeared.

4. The process which comprises suspending 3-nitroso-2:6-di-amino-pyridine in water and treating the resultant with hydrogen sulfide at about 40°–45° C. until crystals of the nitroso compound have disappeared.

5. The process which comprises suspending 3-nitroso-2:6-di-amino-pyridine in water and treating the resultant with a reducing agent from the group consisting of hydrogen sulfide and zinc dust in acetic acid solution until crystals of the nitroso compound have disappeared.

6. The process which comprises treating 3-nitroso-2:6-di-amino-pyridine with a reducing agent from the group consisting of hydrogen sulfide and zinc dust in acetic acid solution until the corresponding tri-amino compound is formed.

7. The product obtainable by treating 100 parts of 3-nitroso-2:6-di-amino-pyridine suspended in 500 parts of water with hydrogen sulfide at 40°–45° C. until the crystals of the nitroso compound have disappeared, clarifying the resultant suspension by filtering off the sulfur formed and rendering the clarified solution alkaline which product probably has the structural formula

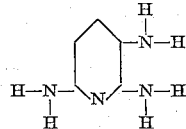

and which is converted by oxidation to a blue dye, the said blue dye being converted with boiling in water to a greenish-yellow dye having a brilliant blue fluorescence.

8. 2,3,6-tri-amino-pyridine.

9. The process which comprises suspending 3-nitroso-2:6-di-amino-pyridine in water and treating the resultant with hydrogen sulfide until crystals of the nitroso compound have disappeared.

10. The process which comprises treating 3-nitroso-2:6-di-amino-pyridine with hydrogen sulfide until the corresponding tri-amino compound is formed.

MAX ENGELMANN.